United States Patent
Bierbaum et al.

(10) Patent No.: US 10,436,618 B2
(45) Date of Patent: Oct. 8, 2019

(54) FIELD DEVICE FOR DETERMINING A MEASURED VARIABLE AND METHOD FOR COMMUNICATION

(71) Applicant: KROHNE Messtechnik GmbH, Duisburg (DE)

(72) Inventors: Dirk Bierbaum, Lünen (DE); Ralf Haut, Krefeld (DE); Christian Hansen, Hattingen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 113 days.

(21) Appl. No.: 15/048,037

(22) Filed: Feb. 19, 2016

(65) Prior Publication Data

US 2016/0245676 A1    Aug. 25, 2016

(30) Foreign Application Priority Data

Feb. 20, 2015    (DE) .......................... 10 2015 102 486

(51) Int. Cl.
| | | |
|---|---|---|
| *G01D 21/00* | (2006.01) | |
| *G05B 19/042* | (2006.01) | |
| *G01D 3/08* | (2006.01) | |

(52) U.S. Cl.
CPC .......... *G01D 21/00* (2013.01); *G05B 19/0428* (2013.01); *G01D 3/08* (2013.01)

(58) Field of Classification Search
CPC .......... G01D 18/00; G01D 21/00; G01D 3/08; G05B 19/0428; H04L 1/24; H04L 43/50; H04L 12/413; G01S 7/4863; G01S 17/10; G01S 17/89; G01S 7/4865; Y04S 40/168
USPC ................................ 702/183, 188; 356/5.01
See application file for complete search history.

(56) References Cited

U.S. PATENT DOCUMENTS

| | | | |
|---|---|---|---|
| 7,321,846 B1* | 1/2008 | Huisenga .................. | H04L 1/24 702/183 |
| 2012/0249231 A1* | 10/2012 | Okuda .................... | F16K 31/12 327/594 |
| 2014/0116241 A1* | 5/2014 | Valentin-Rumpel .... | F15B 5/006 91/361 |
| 2015/0163123 A1* | 6/2015 | Kitchener ............... | H04L 43/50 370/252 |

* cited by examiner

*Primary Examiner* — Mouloucoulaye Inoussa
(74) *Attorney, Agent, or Firm* — David S. Safran; Roberts Mlotkowski Safran Cole & Calderon, P.C.

(57) ABSTRACT

A field device for determining a measured variable and that also issues a measured value in the case that an error state is present. The field device includes a sensor unit, a signal outlet, and an output device. The output device issues a state signal and/or a measuring signal via the signal outlet, wherein the state signal is assigned to a state of the field device. Additionally, the output device fulfills a safety function in the case that the state of the field device arises and thereby issues both the state signal assigned to the state as well as the measuring signal. Furthermore, there is a method for communicating the presence of a state of a field device.

7 Claims, 2 Drawing Sheets

FIELD DEVICE FOR DETERMINING A MEASURED VARIABLE AND METHOD FOR COMMUNICATION

BACKGROUND OF THE INVENTION

Field of the Invention

The invention relates to a field device for determining at least one measured variable. The measured variable is, for example, the volume or mass flow, the density, the fill level, the temperature, the pH, or the electric conductivity of a medium in a tube, container or channel. The invention further relates to a method for communicating the presence of a state of a field device to a receiving device.

Description of Related Art

Field devices designed as measuring devices are used in modern process automation in order to monitor media or processes or to control them based on determined measured values.

Several standards are known for the output of measuring signals determined by the field devices. In addition to simple signal outlets, such as 4 . . . 20 mA current outlet, pulse, or frequency outlets, state outlets are also used for transmitting the device state or measured value state. Furthermore, there are more complex fieldbus systems, such as HART, Fieldbus Foundation or Profibus.

In addition to merely determining the measured variable, modern field devices are able to determine errors. Such errors consist, for example, of the occurrence of inadmissible measured variables (e.g. temperatures that are too high) or of the occurrence of a problem in the field device itself—e.g. in signal processing or in individual components of the field device. This possibility of self-diagnosis is especially significant in safety-critical applications.

Field devices are often developed according to IEC 61508 or, in particular, according to IEC 61511, derived especially for the processing industry for use of the field devices in particularly dangerous and safety-critical processes. Safety or SIL (safety integrity level) functions are thereby at least partially adopted in the field devices. The higher the safety integrity level of a system is, the lower the chance that the required safety function is not carried out by the system as needed. The field devices or components of the field devices developed according to the respective specifications are considered safe or are used for a safety function.

A so-called safety circuit consisting of sensors, actuators, transmitting elements, logic processors, etc., which are accordingly combined with one another for fulfilling safety requirements, is used for the safety function.

Examples of the safety function are the safe deactivation of a motor, the closing of a valve, or the safe deactivation of operation of a process system or at least a part of a system, in which errors have been detected.

Error states are signalized in field devices, for example, when using current outlets with 4 . . . 20 mA signals (these can be, for example, two or also four wire devices), in that current values outside the given range between 4 mA and 20 mA are issued.

If, for example, and error occurs, so that a safe functioning of the field device is no longer guaranteed, then the field device is transferred to a safe state, which can optionally consist of the device shutting itself down. Furthermore, depending on the use, the error current can be evaluated in a SIL application, and the system or at least the parts of the system connected to the field device can be transferred into a safe state for fulfilling the safety function.

According to the prior art, the disadvantage of this error signal is that a measured value from the field device is no longer provided. In some situations, however, it would be advantageous for an evaluation or, respectively, for the taking of measures to be able to access this measured value.

SUMMARY OF THE INVENTION

Thus, an object according to aspects of the invention is to provide a field device or a method for communicating a state of a field device, whereby, in particular, in the presence of an error state, a measured value is provided and the state is safely communicated. Overall, a safety function should be implemented by the field device or, respectively by the method for communication.

The field device according to the invention, in which the above derived and described object is met, is characterized in that at least one sensor unit is provided for generating a measured signal, that at least one signal outlet for issuing at least one signal, and that at least one output device is provided. Thereby, the output device issues at least one signal state and/or a measuring signal via the at least one signal outlet. The output device fulfills a safety function, in the case that the state of the field device occurs, insofar as it issues both the state signal assigned to the state and the measuring signal.

In one design, the measuring signal is assigned to a measured value—in particular generated by the sensor unit.

The safety function consists, in particular in that the state of the field device—or, in particular an error state of the field device—is reliably signalized by the state signal and by the measuring signal. The safety function is thereby fulfilled by corresponding processing or use of the information associated with the state signals and measuring signals.

Thus, in one design, a current- and service outlet is provided in the field device and both are also used for issuing the state signals or, respectively, measuring signals in the presence of a state or, in particular, of an error.

The field device according to the invention is characterized in that, in the case that a state of the field device is given that makes the output of a state signal assigned to the state necessary, not only the state signal is issued, but also a measuring signal.

It is provided in one design that the output measuring signal is assigned to a current, measured value or a measured value previously, preferably generated by the sensor unit. The current, measured value is, thereby, in particular, the last measured value determined by the sensor unit. This measured value is close in time to the presence of the state. Thus, alternatively, a measuring signal is issued that is assigned to a measured value obtained previously—in particular by the sensor unit of the field device. This is quasi an older value that has been preferably, previously obtained before the occurrence of the state of the field device or, respectively, before the occurrence of the error of the field device.

In one design, the field device has a storage unit in which the measured value can be stored for the output of older measured values.

Several states of the field device are defined in one design, which are each assigned a state signal to be issued. A state is, thereby, in particular in one design, an error state, so that the state signal is, in particular, an error signal. In an associated design, different error states are not generally signalized by an error signal, rather by individual, assigned error signals. In one design, different states or, respectively, different errors are each assigned a state signal.

Examples of types of errors are hardware errors due to defective components that lead to lasting error behavior of the field device (for example, called error type 1). Other variations are fundamental errors (e.g. caused by aging of components or temperature-dependency) or coincidental errors (e.g. bit flips) that lead permanently or also only short-term to a measuring error (for clarity, here respectively called error type 2). By signalizing the state with different state signals, a differentiated reaction to different error states of the field device is possible on the receiving side. Thus, it would be provided in one design, in the presence of error type 1 that, according to the prior art, the field device is transferred into the safe state (according to IEC 61508) and the error state is signalized to the process control center via the current outlet that issues safety-relevant measuring variables. In the case of error type 2, in this design, the measuring variable would be further signalized as measuring signal and, additionally, signalized as error signal in respect to the error state via the second outlet (state outlet) to the process control center as receiving device.

In order to guarantee the safety function that is used in the field device, on the side of the receiving device that receives the signals of the field device, it should be considered that the dependence of the state recognized by the field device and signalized by the state signal is accordingly taken into consideration in processing and using the received signals. Since information about the nature or type of state or, respectively the type of error results from the state signal, this knowledge can be accordingly acknowledged or considered in the further processing of the measuring signal. The implementation of the safety function results from the interaction between the field device and the receiving device attached to it. The type of processing of signals of the field device can, for example, be provided in an operating manual.

Preferably, the field device has at least one sensor unit that is used for actual measurement and that, depending on the used measuring principle, interacts with the medium whose measuring variable is to be determined or with the concerned process. Furthermore, an output device is provided that provides the output of signals via the at least one signal outlet.

How the signals are issued is described in following designs.

In one design, the output device alternatingly issues the state signal and the measuring signal via only one signal outlet.

In one design, a setting can be made indicating whether the state signals are issued alone or alternating with the measured values via the one signal outlet and, optionally, depending on the type of state or, respectively, error of the field device. In this design, it is, thus, possible to switch between a classic signal output and an alternating signal output.

In one design, alternating output occurs in that both signals are issued directly alternating.

In a further design, additional information, which indicates that not only the measuring signal is issued, is transmitted by the type of sequence of state and measuring signals.

At least two signal outlets are provided in a further preferred design. These are a first signal outlet and a second signal outlet. The output device issues the measuring signal via the first signal outlet and the state signal via the second signal outlet.

In one design, the first signal outlet is designed as current signal outlet (optionally as two- or four-wire outlet) and the second signal outlet is designed as a service interface, that is designed as an output interface for digital signals. Supply of energy still occurs via the first signal outlet and the second signal outlet is an additional outlet for signals or information.

It is provided in one design that the output device issues the measuring signal in the form of a 4 . . . 20 mA signal. The signal outlet is, thus, accordingly designed for the output of such signals. In an alternative design, the measuring signal is issued via a pulse outlet.

In one design, the field device has at least one input unit. The input unit is designed in the form of a human machine interface (HMI) in one design. In an alternative design, it is one of the above-mentioned signal outlets, which is additionally used as signal inlet of the field device. The input unit is thereby connected to the output device, so that the type of output of state signal and/or measuring signal can be given via the input unit.

One design consists thereby of the type of output of the state signals assigned to the states being able to be changed via the input unit, but only for a given group of states of the field device. In this design, there is one group of states—e.g. special error states—whose output cannot be set, but rather is fixed. Specification is carried out, for example, during production of the field device or during initial installation.

It is provided in one design that, for a given standard group of states of the field device, in the case that a state belonging to the standard group occurs, the output device issues only the state signal assigned to the occurring state. Thus, a group of particular states of the field device is defined. If one of these states occurs, then only the associated state signal is issued and the measuring signal is not also issued (i.e. classic output).

According to a further teaching of the invention, the object is achieved by a method for communicating the presence of a state—in particular the presence of an error—of a field device to a receiving device. It is thereby provided in the method that, in the case that the state occurs, both a measuring signal assigned to a measured valued determined by the field device as well as a state signal assigned to the state are transmitted from the field device to the receiving device and that a safety function is fulfilled by the field device and by the receiving device. Thus, a safety circuit is formed by the field device and the receiving device fulfills, for example, the standard IEC 61508 or IEC 61511. The receiving device thereby includes the elements, components, etc. that are arranged opposite the field device on the receiver side for the signals of the field device and, in particular, are also used for processing the signal. The receiving device, thus, consists of several individual components, in one design.

It is provided, in one design, that the measuring signal received by the receiving device and the state signal received by the receiving device are processed in view of the state associated with the state signal. Field device and receiving device thereby fulfill a safety function. The receiving device is, in one design, a process control center and, additionally or alternatively, consists of a plurality of individual components. Further elements are thereby arranged between the field device and the receiving device, in one design.

The field device and the receiving device are components of a safety circuit that fulfills a safety function. If a state arises, it is identified by the field device and signalized via the state signal to the receiving device, in order to trigger a corresponding reaction there. The reaction is, thereby, the implementation of the safety function. A measuring signal is initially issued by the field device.

In one design of the method, it is provided that a setting is made indicating whether the measuring signal transmitted by the field device is assigned to a current measured value or to a measured value previously generated by the field device. In such a configuration, in one design, the states are given for which only the state signal is issued and no measuring signal is issued. In one design, the configuration in respect to the measuring signal to be issued is preferably carried out after or during the installation of the field device at the process site.

The above explanations in respect to the field device can also be applied, in particular, for the method for communication or, respectively, on the other hand, the field device is designed such that is implements the steps of the method.

The invention, thus, also relates to a method for determining a measured variable by a field device, wherein at least the field device and a receiving device form a safety circuit and wherein the field device communicates the occurrence of a state according to the above method.

Finally, field device and receiving device form a system according to the invention that has a safety function.

In detail, there is a plurality of possibilities for designing and further developing the field device according to the invention and the method according to the invention. Reference is made to embodiments described herein in conjunction with the accompanying drawings.

DETAILED DESCRIPTION OF THE INVENTION

Figure 1:
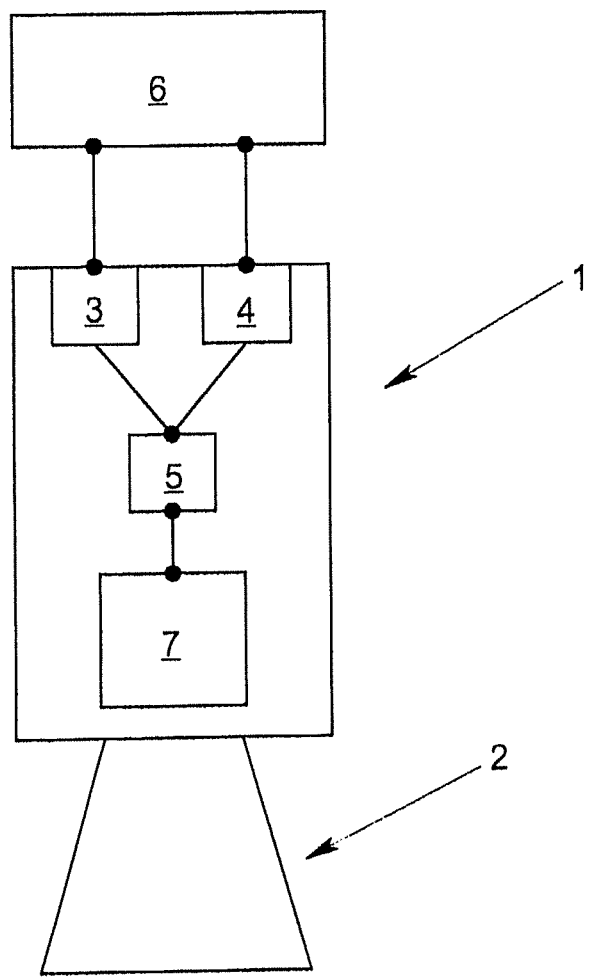
FIG. 1 a schematic representation of a field device connected to a process control center and FIG. 2 a schematic representation of an exemplary signal of a field device.

A field device is schematically shown in FIG. 1. The field device 1 is thereby used for determining the fill level of a—not shown here—medium, for which a sensor unit 2 is provided. In the shown embodiment, there is an antenna for sending and receiving microwave signals. The invention is thereby not limited to the shown type of measurement, but can also be used for other measuring principles.

The field device 1 has two signal outlets: a first signal outlet 3 and a second signal outlet 4. Both signal outlets 3, 4 are used by the output device 5 for issuing signals. Hereby, the measuring signals are issued via the first signal outlet 3 and the state signals assigned to possibly arising states are issued via the second signal outlet 4.

In the shown design, the first signal outlet 3 is the current outlet, which is used for energy supply of the field device 1 and via which signals—here, as an example, 4 . . . 20 mA signals—are issued. The second signal outlet 4 is a so-called service interface that allows for the output of signals in addition to the first signal outlet 3.

The field device 1 is connected to a process control center 6 via the two signal outlets 3, 4, which receive and accordingly process the output signals. The process control center is an example, here, of a receiving device. The field device 1 and the process control center 6 form a safety circuit that fulfills a safety function. However, further—not shown here—components, units, instances, etc. can also be part of the safety circuit.

Measuring signals are issued via the first signal outlet 3. During normal operation, the measuring signals are assigned to the measured value, which has been determined by the sensor unit 2. Normally, thus, the measuring signal represents the current, determined measured value.

If a particular state, e.g. an error in the field device 1, arises, then the output device 5 issues, in addition to the measuring signal, the state signal assigned to the state via the second signal outlet 4.

Thus, the field device 1 is designed for self-monitoring and acknowledges, for example, that an error has occurred. An error is e.g. a measured value outside of a given interval or also the occurrence of a process condition outside of a predetermined specification (e.g. a temperature that is too high, which is determined as a secondary measured variable by a corresponding temperature sensor). Additionally or alternatively, some field devices also allow for the screening of hardware components.

The special feature here is that, after recognizing the state or the error, both the state signal as well as a measuring signal, and thus two pieces of information, are issued from the field device 1. The field device 1 thereby fulfills, in particular, a safety function that is also defined by the type of application or the process.

Thus, the process control center 6 is able to receive two pieces of information: the information about the presence of an error and the information about the—at least as a trend—measured value.

Depending on the use, an adaptation of the type of output of the signals can be necessary. This is also true for setting whether a current or previously-determined, i.e. old, measured value should be issued as measuring signal in the presence of a state. This is made possible, here, with an input unit 7, which affects the output device 5 and thus indicates the type of signal output.

The field device 1 fulfills the safety function in that it recognizes a state and, in particular an error and transmits this information as state signal to the receiving device 6. The information about the presence of a state is broadened by the information about the—current or obtained, older—measured value. On the receiving side receiving the signal, i.e. in the receiving device 6, it is necessary for the fulfillment of the safety function that the signals of the field device 1 are adequately processed in the sense of the safety function.

Figure 2:
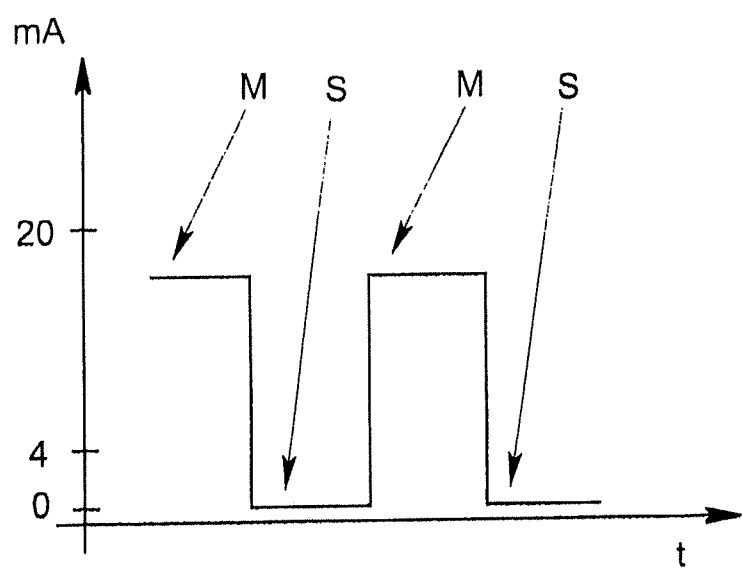

If the designs shown in FIG. 1 of both signals: state signal and measuring signal are issued via two separate signal outlets, then FIG. 2 shows an output signal that originates from a signal outlet and transmits both the measuring signal M and the state signal S. The transition between the two parts of the signal M and S indicates on the receiving side that the measuring signal M should be used with caution.

What is claimed is:

1. A field device for determining at least one measured variable, comprising:
   at least one sensor unit for generating a measured value,
   at least one signal outlet for issuing at least one signal, and
   at least one output device that issues at least one state signal and at least one measuring signal via the at least one signal outlet,
   wherein the at least one state signal corresponds to a respective state of the field device,
   wherein the at least one measuring signal corresponds to the measured value generated by the at least one sensor unit,
   wherein, in the case that an error state of the field device arises, both the state signal as well as the measuring signal are output by the output device, wherein the output device executes a safety function when the error state arises, and wherein the safety function causes shifting of the field device into a safety state based on the particular error state detected.

2. Field device (1) according to claim 1, wherein the issued measuring signal (M) is assigned to a current measured value or to a measured value previously generated by the at least one sensor unit (2).

3. Field device (1) according to claim 1, wherein the output device (5) alternatingly issues the state signal (S) and the measuring signal (M) via only one signal outlet (3).

4. Field device (1) according to claim 1, wherein the at least one signal outlet (3, 4) includes a first signal outlet (3) and a second signal outlet (4), and the output device (5) issues the measuring signal (M) via the first signal outlet (3) and issues the state signal (S) via the second signal outlet (4).

5. Field device (1) according to claim 1, further comprising at least one input unit (7), wherein the input unit (7) is connected to the output unit (5) and wherein the type of output of state signal (S) and/or measuring signal (M) can be selected via the input unit (7).

6. Field device according to claim 1, wherein the error states are at least one hardware errors due to defective components, fundamental errors caused by aging of components or temperature-dependency, or coincidental errors that lead to a measuring error, and wherein each of the error states is signalized with a different state signal so that a differentiated reaction to different error states of the field device is produced.

7. Field device according to claim 1, wherein the at least one sensor unit for generating a measured value has means for generating measured values of at least one of volume or mass flow, density, fill level, temperature, pH, or electric conductivity of a medium in a tube, container or channel.

* * * * *